United States Patent [19]

Buschor

[11] 4,196,465
[45] Apr. 1, 1980

[54] ELECTROSTATIC POWER COATING GUN

[75] Inventor: Karl Buschor, St. Gallen, Switzerland

[73] Assignee: Gema AG Apparatebau, St. Gallen, Switzerland

[21] Appl. No.: 964,083

[22] Filed: Nov. 27, 1978

[30] Foreign Application Priority Data

Dec. 8, 1977 [CH] Switzerland ............ 15044/77

[51] Int. Cl.² ............................................ B05B 5/02
[52] U.S. Cl. .................... 361/228; 361/235; 118/621; 239/692; 363/61
[58] Field of Search ............ 361/226, 227, 228, 232, 361/235; 118/621, 629; 239/706, 692, 690; 363/59, 60, 61, 146

[56] References Cited

U.S. PATENT DOCUMENTS

| | | |
|---|---|---|
| 3,599,038 | 8/1971 | Skidmore ............ 361/235 |
| 3,731,145 | 5/1973 | Senay ............ 361/235 X |
| 4,033,506 | 7/1977 | Braun ............ 363/59 X |
| 4,092,695 | 5/1978 | Henderson et al. ............ 361/232 |
| 4,120,016 | 10/1978 | Hendricks ............ 361/235 X |
| 4,120,017 | 10/1978 | Sickles ............ 361/228 |

*Primary Examiner*—J. D. Miller
*Assistant Examiner*—L. C. Schroeder
*Attorney, Agent, or Firm*—Werner W. Kleeman

[57] ABSTRACT

An electrostatic coating gun in which there is mounted a high-voltage generator for powering charging electrodes arranged at the region of the gun muzzle. To improve maintenance of the high-voltage generator the latter is subdivided into modular-like circuit components which can be interconnected by means of detachable electrical connections and removably arranged in a chamber formed in the spray gun. The detachable electrical connections advantageously are in the form of plug connections and the chamber is preferably of elongate configuration and arranged parallel to the gun barrel in a gun body. The chamber can be closed at one end and at the other end can be closable by means of a cover.

5 Claims, 5 Drawing Figures

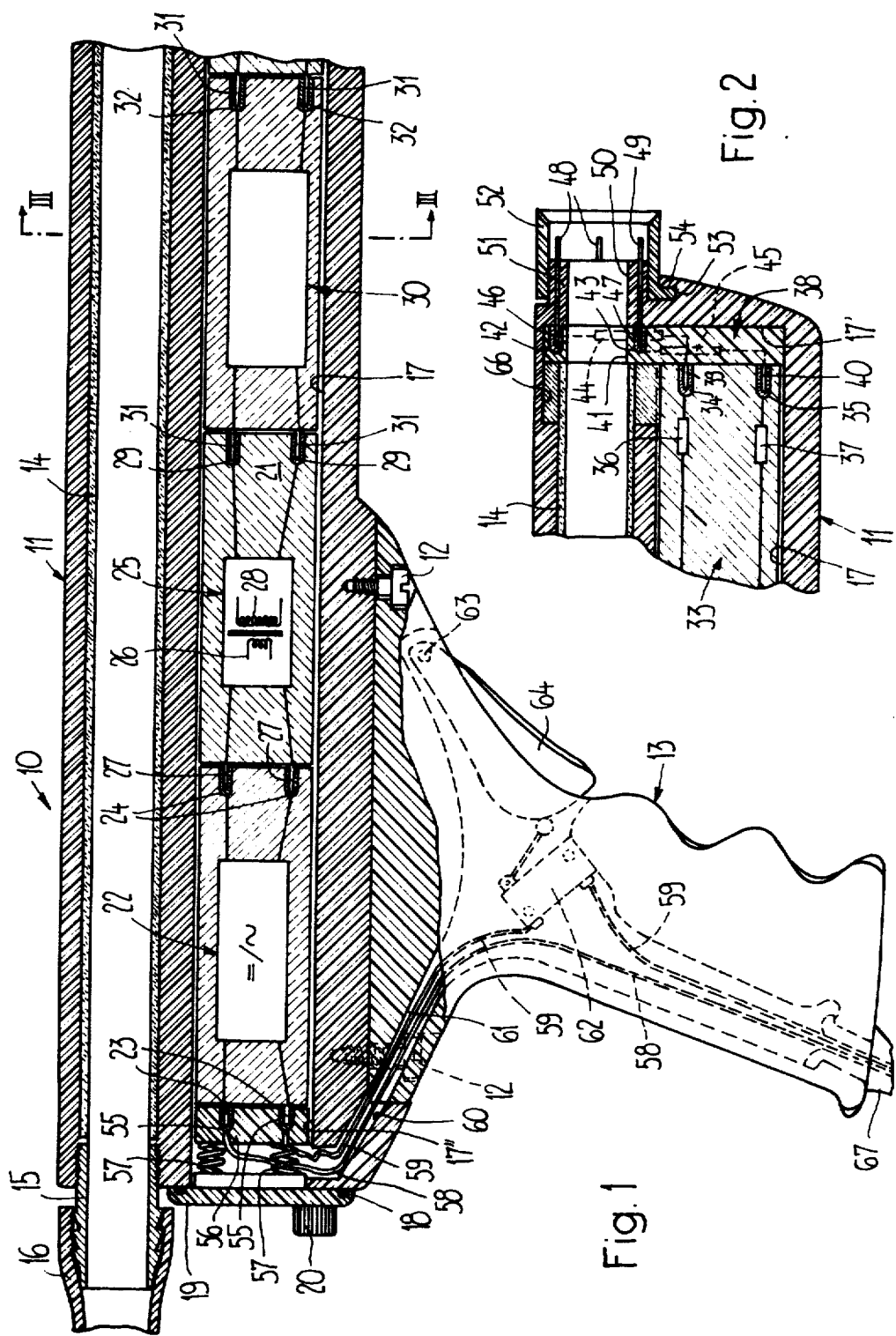

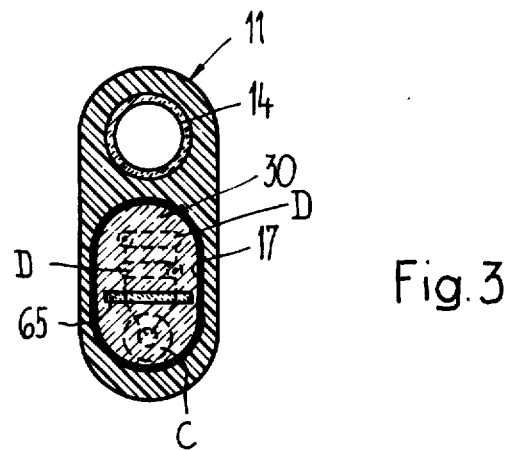
Fig. 3
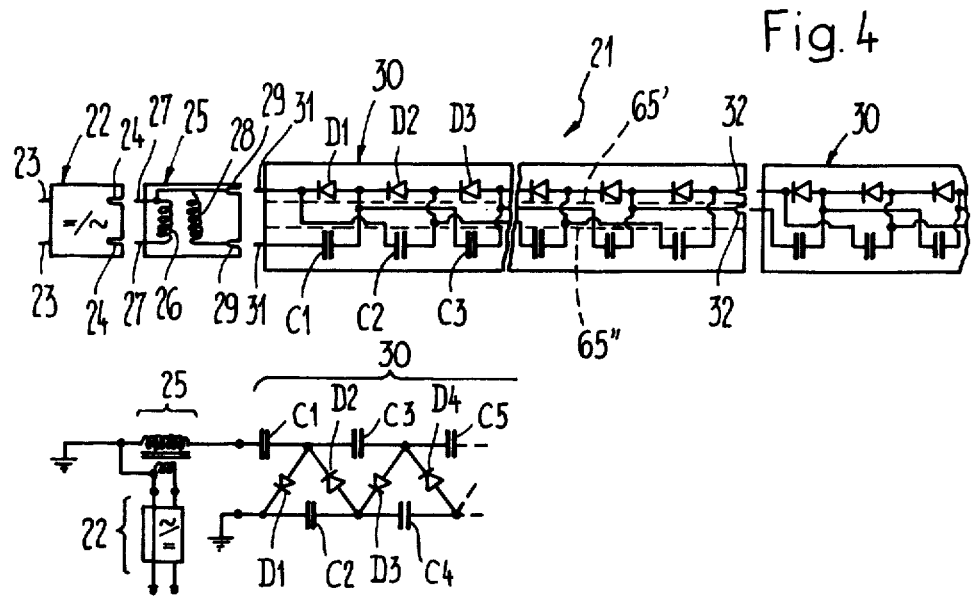
Fig. 4
Fig. 5

ELECTROSTATIC POWER COATING GUN

BACKGROUND OF THE INVENTION

The present invention relates to a new and improved construction of electrostatic powder coating gun or pistol. The electrostatic powder coating gun of the invention is of the type comprising a high-voltage generator arranged in a chamber extending parallel to the spray gun barrel and formed in the gun itself. The high-voltage generator comprises an oscillator, a transformer and a voltage multiplying cascade circuit, the output of which is connected with charging electrodes arranged at the region of the muzzle of the gun barrel.

Such powder coating guns are known to the art. A reason why the high-voltage generator is mounted in the spray gun itself resides in the fact that the supply voltage which is to be delivered to the gun is lower than that needed for operating the charging electrodes, so that in any event the electrical supply line leading to the spray gun requires less complicated insulation.

With a known spray gun of this type, as disclosed in U.S. Pat. No. 3,559,038, granted Aug. 10, 1971, the high-voltage generator comprises a voltage multiplier cascade circuit which is molded in the gun body formed of plastic. The gun body surrounds the gun barrel or spray tube and extends essentially parallel to the gun barrel. A drawback of such spray gun resides in the fact that upon failure of one of the circuit elements of the cascade circuit (rectifier element or capacitor) it is necessary to replace the entire gun body.

The same essentially also is the case for the prior art gun known from the Austria Pat. No. 326,242. With this construction the oscillator and the transformer are arranged in a hollow compartment or space formed at the handle portion of the gun and connected by means of wire connections with the voltage multiplier cascade or cascade arrangement, which, in turn, is arranged in a chamber extending parallel to the gun barrel. In this case the voltage multiplier cascade is structured as a single molded component, so that also upon failure of a circuit element in the cascade it is necessary to replace the entire component.

The same, perhaps with only slight modification, also is true for the guns which have become part of the state-of-the-art from Swiss Pat. Nos. 496,481, 509,106, 578,379 and U.S. Pat. No. 3,731,145.

The differences only reside in the fact that with one such guns the high-voltage generator or parts thereof are molded or cast in the gun body surrounding the barrel or the spray tube or in a handle portion and/or however that apart from the voltage multiplier cascade there is incorporated by molding a transformer arranged forwardly thereof and/or an oscillator connected ahead of the transformer in the gun body.

However, the more circuit elements of the high-voltage generator which are molded or cast in the spray gun that much lower is the supply voltage, but, however, there is simultaneously increased the risk of malfunction of the high-voltage generator, and thus the entire coating gun.

SUMMARY OF THE INVENTION

Hence, with the foregoing in mind it is a primary object of the present invention to provide a new and improved construction of electrostatic powder coating gun which is not associated with the aforementioned drawbacks and limitations of the prior art proposals.

Another and more specific object of the present invention aims at the provision of a new and improved construction of electrostatic powder coating gun of the previously mentioned type wherein the aforementioned drawbacks can be extensively avoided, practically without any impairment in the handling and safety of the gun, and further, wherein it is possible to simply and rapidly carry out maintenance of the coating gun.

Now in order to implement these and still further objects of the invention, which will become more readily apparent as the description proceeds, the proposed electrostatic powder coating gun according to the invention is manifested by the features that the oscillator and the transformer are each formed by a respective module and the voltage multiplier cascade by a number of modules. These modules have the same cross-sectional configuration and are electrically interconnected with one another by plug connections and stacked in a column-like fashion within the chamber.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic longitudinal sectional view through the rear portion of an electrostatic powder coating gun designed according to the invention;

FIG. 2 is a schematic longitudinal sectional view through the muzzle region of the gun of FIG. 1.

FIG. 3 is a cross-sectional view taken substantially along the line III—III of FIG. 1;

FIG. 4 is an electrical circuit diagram of part of a high-voltage generator, wherein the circuit elements have been shown approximately in a spatial arrangement which they assume in the circuit units; and FIG. 5 conventionally illustrates part of the circuitry of FIG. 4.

DETAILED DESCRIPTION OF THE PREFERRED EMBODIMENTS

Describing now the drawings, the exemplary embodiment of electrostatic powder coating gun 10, illustrated in FIGS. 1 to 3 will be seen to essentially comprise a barrel portion or barrel 11 and a handle portion or handle 13 removably attached at the barrel portion 11 by means of, for instance, screws or threaded bolts 12 or equivalent structure. The handle portion 13 is removably secured at the barrel portion or barrel 11 in order that the barrel portion 11 also can be attached to a different holder or support, for instance at an automatically moved holder of an automatic electrostatic powder coating installation.

Leading through the barrel portion 11 formed of insulating material, for instance a suitable plastic, is a spray or barrel tube 14, likewise formed of an insulating material, for instance of ceramic. This spray or barrel tube 14 is in alignment at its inlet side with a connection nipple 15 or equivalent structure which is threaded into the barrel portion 11. Connected with the connection nipple 15 is a hose line or conduit 16 which infeeds to the barrel tube 14 in known manner a suspension of coating powder in a carrier gas, for instance typically air.

Formed in the barrel portion 11 is an elongate chamber or compartment 17 extending essentially parallel to the barrel tube 14. The cross-sectional area or cross-section of the chamber 17 is the same over its entire length, in the embodiment under discussion such has an oval configuration, as best seen by referring to FIG. 3. While the chamber 17 is closed at its front end by the thereat formed base or floor 17' as best seen by referring to FIG. 2, the rear end 17" of such chamber 17 is open, however can be closed by a cover 19 provided with a seal 18 and fixedly clamped for instance by clamping screws or bolts 20. Arranged within the chamber 17 is a high-voltage generator, generally designated in its entirety by reference character 21. This high-voltage generator 21 is subdivided into different, modular-like constructed circuit units which are stacked together within the chamber 17 into a column, and, as will be described more fully hereinafter, electrically interconnected with one another by means of the plug connections.

Now viewed from the left towards the right of FIG. 1 there are provided in the exemplary embodiment for the high-voltage generator 21 the following circuit components or units. The first circuit unit is formed by an oscillator 22, whose inputs are structured as plug pins 23 and whose outputs as bushings 24. Following the oscillator 22 as the next circuit unit or section is a transformer 25 whose connections leading to a primary winding 26 are structured as plug pins 27 engaging in the bushings or sockets 24 and whose connections which extend from a secondary winding 28 are structured as bushings or sockets 29. Following the transformer 25 as the next circuit unit or section is one or a number of multi-stage cascade units or sections 30, whose inputs are structured as plug pins 31 and whose outputs are structured as bushings or sockets 32. The plug pins 31 of the first cascade unit or section 30 engage into the bushings or sockets 29 of the transformer 25. As the next to last circuit unit or section there follows the cascade units or sections 30 a further, multi-stage cascade unit or section 33 (FIG. 2) whose output connections again are designed as bushings or sockets 34 and 35, respectively. The bushing 34 is connected by means of a high-ohm resistor 36 with the last stage of the cascade unit 33 and the bushing 35 is connected by means of a high-ohm resistor 37 with the next to last stage of the cascade unit 33. As the last circuit unit or section there follows the cascade unit 33 a resistor module 38 which is provided with two plug pins 39, 40 engaging into the bushings or sockets 34, 35. The resistor or resistance module 38 snugly bears at the base 17' of the chamber or compartment 17 and has a cross-sectional configuration which differs from the remaining circuit units. This resistance module 38 is provided with a bore 41 which is in alignment with the inner diameter of the barrel tube 14. Molded around this bore 41 in the resistance module 38 are a number of bushings, in the exemplary embodiment there are provided four such bushings, wherein in FIG. 2 there are only visible the bushings or sockets 42, 43. The bushing 42 and the non-visible bushings arranged offset 90° with respect to the visible bushing, are connected by means of a protective resistance or resistor 44 molded in the resistance module 38 with the plug pin 39 and the bushing 43, and equally, the non-visible bushings arranged offset by 90° with respect to the bushing 43, are connected by means of a further, molded protective resistor 45 with the plug pin 40.

The bushings 42, 43 are mounted at the rear ends of charging electrodes 48 and 49 structured as plug pins 46 and 47 respectively. These charging electrodes 48 and 49 are arranged about a muzzle bore 50 formed in the muzzle section 51 of the barrel portion 11 and are molded in such muzzle section or portion 51. The muzzle section 51 is surrounded by a protective tube 52 formed of electrically insulating material which is detachably retained by means of a nose 54 formed thereat and engaging into a notch 53, for instance in the manner of a bayonet connection. The protective tube 52 serves particularly as a protection for the free ends of the charging electrodes 48 and 49 which protrude past the end of the muzzle bore 50 and also as protection against contacting such charging electrodes 48 and 49. From what has been stated above it will be apparent that the charging electrodes 48 and 49 are each at a different potential of the same sign so that between these charging electrodes 48 and 49 there is formed a charging field, by means of which there can be charged the particles effluxing from the muzzle bore 50.

The circuit units or sections 22, 25, 30 and 33 all have the same cross-sectional shape, namely a cross-sectional shape which is the mirror image of the inner shape of the chamber 17 and also preferably the same length. The circuit elements of such circuit units are completely cast or molded in an electrically insulating, preferably transparent casting resin, so that each circuit unit or section forms a compact module or component having flat end faces, from which protrude the plug pins or in which there are cast the bushings, as the case may be. The plug pins 23 of the oscillator unit 22 engage into the bushings or sockets 55 which are molded or cast in a connection plate 56. This connection plate 56, in turn, is pressed against the oscillator unit or section 22 by means of compression springs 57 or equivalent structure which are supported at the cover or cover member 19. Leading from the bushings 55 are flexible electrically insulated, low-voltage current-supply lines 58, 59 which are guided through line passageways 60 and 61, respectively, formed in the barrel portion 11 and the handle portion 13. In the partially hollow handle portion 13 there is mounted a microswitch 62 which is connected in circuit with the supply line or conductor 59. This microswitch 62 can be actuated by means of a trigger lever 64 which is hingedly connected at location 63 defining a hinge or pivot means. The supply lines 58, 59 depart from the handle portion 13 in the form of an insulated cable 67 and lead to a not particularly illustrated low-voltage source, for instance a battery.

As to the construction of the individual circuit units, especially the cascade units or sections 30, attention is directed to FIGS. 3 to 5, wherein FIG. 5 has been presented merely for the purpose of portraying the circuitry in conventional manner of a voltage multiplier cascade or cascade arrangement.

The oscillator unit 22 and the transformer 25 essentially can contain the circuitry disclosed in Swiss Pat. No. 583,476, to which reference may be readily had and the disclosure of which is incorporated herein by reference, and particularly can essentially contain a RC-oscillator having a feedback with which there is connected the primary winding 26.

The cascade units or sections 30, as seen from the circuitry illustrated in conventional manner in FIG. 5, have a voltage multiplier circuit composed of two capacitor columns $C_1, C_3, C_5 \ldots$ and $C_2, C_4 \ldots$ and lattice-like intermediately connected rectifier elements $D_1, D_2, D_3, D_4 \ldots$. These circuit elements of the cascade unit 30 are however spatially arranged in such a fashion as schematically shown in FIG. 3 and particularly in FIG. 4. At the one side or face of the printed plate 65 there are arranged all of the rectifier elements D and at the other side or face of such printed plate 65 all of the capacitors C as best seen by referring to FIG. 3, whereas at the printed plate 65 itself—and as has been indicated in FIG. 4 with the broken lines 65' and 65"—there are printed electrical connections between the circuit elements in the form of conductor cracks.

No further discussion is believed to be necessary as concerns the electrical circuit of the high-voltage generator 21.

The assembly of the proposed spray gun can be accomplished in the following manner. Starting with an empty barrel portion 11 which, however, is already equipped at the muzzle section 51 with the charging electrodes 48 and 49, there is initially introduced, in a lying position through the open chamber 17, the resistance module 38, then tilted-up at the region of the base 17' of the chamber 17 and plug connected with the plug pins 46 and 47. In order to tilt-up the resistance module 38 there is provided in the barrel portion 11 of the muzzle section 51 a recess 66, as best seen by referring to FIG. 2. Thereafter, there is inserted from the rear the barrel tube 14 and such is fixedly clamped in place by threading-in the threaded nipple 15, whereby also the resistance module 38 remains pressed against the base or floor 17' of the chamber 17. Then there are introduced, one after the other, the circuit units or sections 33, 30 (one or a number) 25 and 22 into the chamber or compartment 17 and mounted upon the available plug pins. Finally, the connection plate 56 is mounted upon the plug pins 33 and the cover 19 is closed.

If a disturbance arises in the high-voltage generator 21 then the circuit units can be removed from the chamber 17 in the reverse sequence and examined.

It is advantageous if the arrangement of the plug pins and the bushings, as the case may be, between the circuit units or sections is chosen in such a manner that there is only possible one plug-interconnection thereof in the correct sequence. For this purpose there can be employed, by way of example, different diameters of the plug pins and the bushing bores and/or different spacing between the same and/or a different position thereof in relation to the cross-sectional shape of the circuit unit.

Equally, it is possible to render the chamber 17 accessible from both ends and/or to impart thereto a different cross-sectional shape. What is important is that the high-voltage generator be formed at least in part of detachable, electrically interconnectable, modular-like circuit units or sections which can be dismantled at any time and, if a defect arises, can be easily interchanged.

In the event that the spray gun should be connected with an alternating-current voltage source, then of course it is unnecessary to provide the oscillator unit or section 22. In its place there can be then employed a filler unit or section (not shown) having the same external dimensions, at which the pins 23 are directly connected with the bushings 24.

While the proposed invention has been described by way of example in conjunction with a powder coating spray gun, it should be readily understood that the invention also can be employed with coating guns for wet spraying, for instance such which are known to the art under the designation "Airless"-guns.

While there are shown and described present preferred embodiments of the invention, it is to be distinctly understood that the invention is not limited thereto, but may be otherwise variously embodied and practiced within the scope of the following claims. Accordingly,

What I claim is:

1. An electrostatic powder coating gun, comprising:
   a gun member having a gun barrel containing a muzzle;
   said gun member being provided with a chamber extending essentially parallel to the gun barrel;
   a high-voltage generator arranged in said chamber;
   said high-voltage generator containing an oscillator, a transformer and a voltage multiplier cascade;
   charging electrodes arranged at the region of the muzzle of the gun barrel;
   said voltage multiplier cascade having outlet means connected with said charging electrodes;
   each said oscillator and said transformer being structured by a respective module;
   said voltage multiplier cascade being structured by a number of modules;
   said modules having essentially the same cross-sectional configuration;
   plug connection means for electrically interconnecting said modules with one another; and
   said modules being stacked in a column-like fashion within said chamber.

2. The electrostatic powder coating gun as defined in claim 1, wherein:
   each of said modules has a cross-sectional configuration which is the same throughout its length and deviates from a circular configuration; and
   said chamber having a cross-sectional configuration which essentially is the mirror-image of the cross-sectional configuration of the modules.

3. The electrostatic powder coating gun as defined in claim 2, wherein:
   said chamber has a front end and a rear end;
   said chamber being structured to be closed at its front end;
   a detachable cover means for closing said chamber at its rear end;
   spring means supported at said cover means and urging said modules against one another in their lengthwise direction.

4. The electrostatic powder coating gun as defined in claim 1, wherein:
   said voltage multiplier cascade comprises capacitors and diodes;
   each module of the voltage multiplier cascade containing a conductor track plate means having opposite faces;
   the capacitors being arranged at one face and the diodes at the other face of said conductor track plate means.

5. An electrostatic powder coating gun, comprising:
   gun means having a gun barrel containing a muzzle;
   said gun means being provided with a chamber extending essentially parallel to the gun barrel;
   a high-voltage generator arranged in said chamber;
   said high-voltage generator containing a transformer and a voltage multiplier cascade;
   charging electrodes arranged at the region of the muzzle of the gun barrel in circuit with said voltage multiplier cascade;
   said transformer being structured as a module;

said voltage multiplier cascade being structured by a number of modules;
said modules having essentially the same cross-sectional configuration;

plug connection means for electrically interconnecting said modules with one another; and
said modules being stacked in a column-like fashion within said chamber.

* * * * *